Nov. 30, 1965    R. P. FRANKLIN    3,220,449
SELF-CLEANING HOLE SAW
Filed March 4, 1964    2 Sheets-Sheet 1
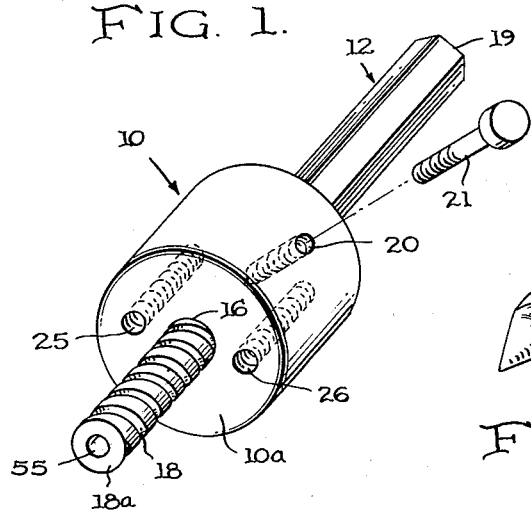
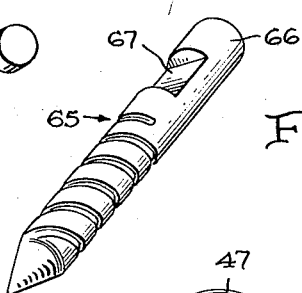
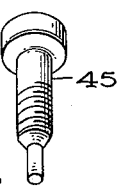
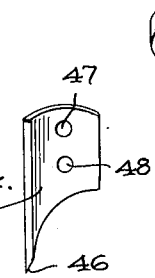
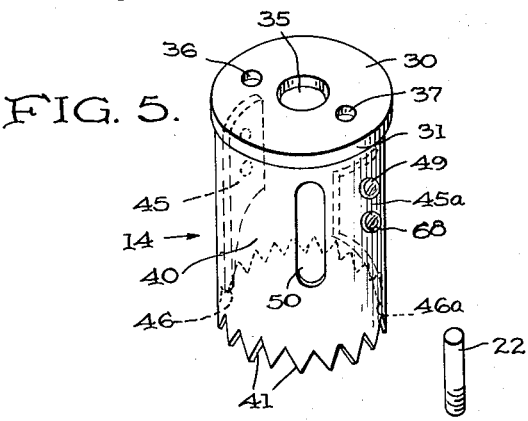
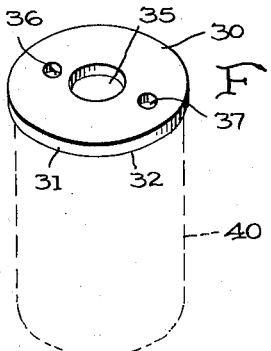
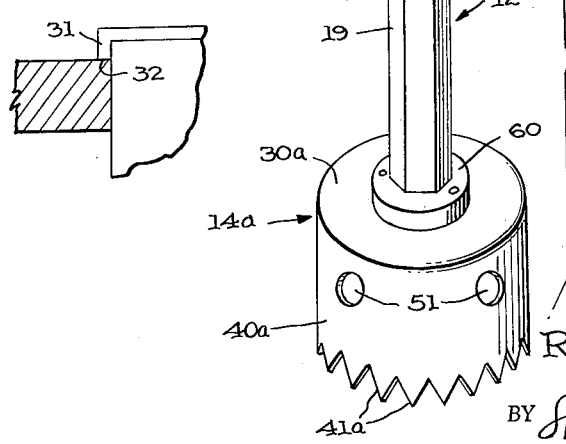
INVENTOR
ROBERT P. FRANKLIN
BY *William D. Stokes*
ATTORNEY Nov. 30, 1965  R. P. FRANKLIN  3,220,449
SELF-CLEANING HOLE SAW
Filed March 4, 1964  2 Sheets-Sheet 2
FIG. 9.
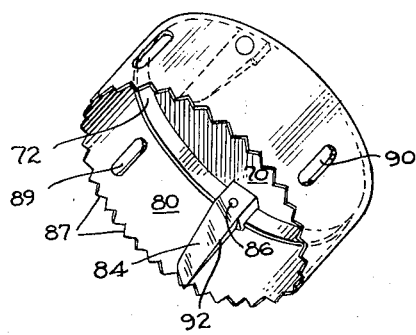
FIG. 10.
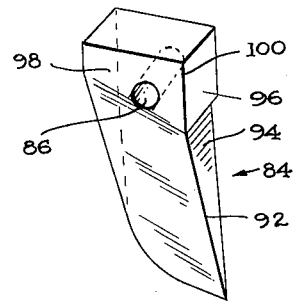
FIG. 12.
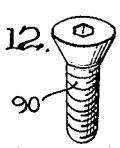
FIG. 11.
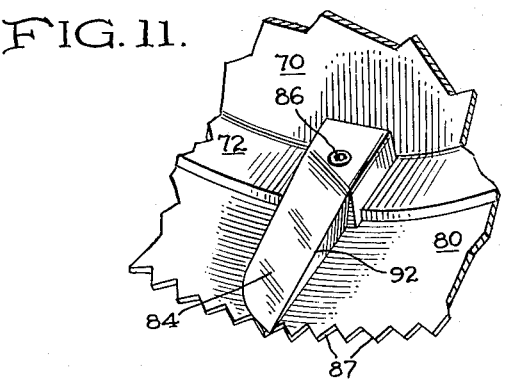
FIG. 13.
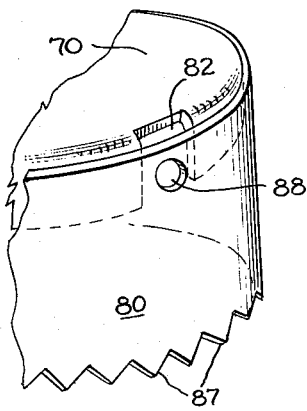
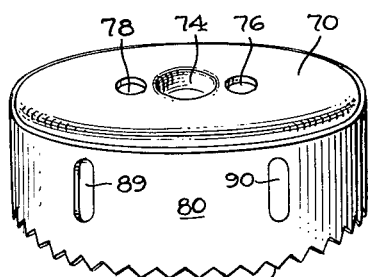
FIG. 14.
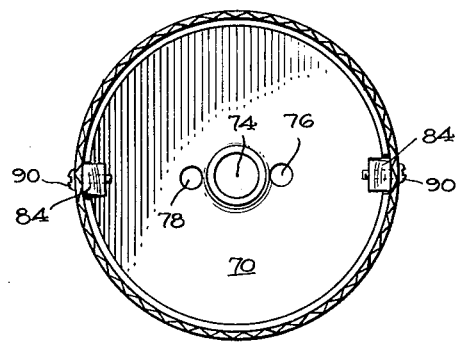
FIG. 15.
INVENTOR
ROBERT P. FRANKLIN
BY William A. Stokes
ATTORNEY

United States Patent Office 3,220,449
Patented Nov. 30, 1965

3,220,449
SELF-CLEANING HOLE SAW
Robert P. Franklin, 3633 San Lu Rae Drive, Elkhart, Ind.
Filed Mar. 4, 1964, Ser. No. 349,390
6 Claims. (Cl. 145—120)

This application is a continuation-in-part of application Serial No. 288,729, filed June 18, 1963 and now abandoned.

This invention relates to a self-cleaning hole saw, and has for its principal object the provision of a novel device for cutting holes in wood or other materials which is accurate, efficient, safe, speedy, and does not bind.

Another object of this invention relates to incorporating in the self-cleaning hole saw device, a self-cleaning construction that will clean itself from the wood cuts resulting in a saving of time in the use of the device and providing for safer operation thereof.

Another object of this invention is to provide a self-cleaning hole saw that may be used with a mandrel.

A further object of this invention is to provide a self-cleaning hole saw which has a plurality of removable blades which are quickly and easily attached to a hole saw for cleaning the hole saw from wood cuts.

A further object of the invention is to provide a hole saw which does not become plugged as a result of the hole sawing operation.

These and other objects are attained in accordance with the instant invention by the provision of a self-cleaning hole saw device comprising a collar, a stud axially adjustable within said collar having a shank portion for attachment to a drill or the like, a cylindrical saw unit removably secured to the collar, and having at least one pair of shaving blade means disposed interiorly of the cylindrical saw unit and adjacent the lower end thereof, the saw unit providing at its upper interior portion a collecting chamber for shavings and cuttings.

These and various other objects the invention attains by the construction hereinafter described and illustrated in the accompanying drawing, wherein:

FIG. 1 is a perspective assembly view of a part of the self-cleaning hole saw device;

FIG. 2 is a perspective view of a drill associated therewith;

FIG. 3 illustrates one of a pair of screws to be employed in the assembly of FIG. 1;

FIG. 4 is a shaving blade element for use with the hole-saw unit shown in FIG. 5;

FIG. 5 is a perspective view of the hole-saw unit showing the disposition of the shaving blades within the interior thereof;

FIG. 6 is a perspective view of the flange head of the hole-saw unit of FIG. 5;

FIG. 7 is a perspective view of a modified form of the hole saw device;

FIG. 8 is a cross-sectional view taken on line 8—8 of FIG. 5;

FIGS. 9–15 relate to a second embodiment of the hole saw of this invention and in particular FIG. 9 represents a view in perspective of an embodiment of this invention showing two removable cutting blades in place, one blade being shown in phantom;

FIG. 10 is a perspective view in detail of one of the removable blades;

FIG. 11 is a fragmentary view of a section of a hole saw of this invention showing one removable cutting blade in position;

FIG. 12 is a perspective of an attaching means for attaching the removable blade in position;

FIG. 13 is a fragmentary view of the outside of an embodiment of this invention showing the attaching hole a positioning slot for the removable blade;

FIG. 14 is a side view partly in perspective, showing two movable blades in phantom in position on the inside of the hole saw; and FIG. 15 is a bottom plan view of one embodiment of the inventive concept showing the removeable blades fastened in operating position.

One embodiment of the self-cleaning hole saw device consists of a cylindrical collar 10, a stud 12, and a cylindrical saw unit 14. The collar 10 is provided with an axial threaded bore 16, to receive in threaded engagement the lower threaded portion 18 of the stud 12. The upper portion of the stud 12 is formed hexagonal as illustrated to provide a shank 19 to fit within the chuck of a power or hand-drill in the manner well known. Provided in the collar 10 is a radial threaded opening 20 adjacent to the bottom 10a thereof, for the reception of a set screw 21 which operates to lock the stud 12 in adjusted position relative to the collar 10 as is readily apparent. The shank 19 is normally dimensioned for use with a ½"–¾" drill and can be accommodated for use with a ¼"–⅜" drill by the provision of an auxiliary stud 22, see FIG. 7, which is threaded into an axial threaded opening 23 in the end of shank 19. Further provided in the collar 10 are a pair of parallel diametrically opposed threaded openings 25, 26, equally spaced from the axis of the bore 16 and parallel thereto for a purpose to be hereinafter described.

The cylindrical saw unit 14 is formed of a circular disc-shaped head 30 provided with a depending peripheral flange 31 of a desired depth and thickness, the terminal edge surface 32 of the flange 31 serving as a butt edge or stop, as will be hereinafter described. Provided in the head 30 are openings 35, 36 and 37 corresponding respectively with the openings 16, 25 and 26 of the collar 10. A cylindrical saw element 40 having an external diameter substantially equal to the inside diameter of the flange 31, is slipped inside the flange 31 and is secured thereto by welding such that the butt edge 32 of the flange 31 will lie exteriorly of the saw element, see FIG. 6, wherein the saw element 40 is shown by dotted lines. The bottom edge of the saw element is provided with conventional cutting teeth 41.

The cylindrical saw unit 14 is mounted on the underside or bottom 10a of the collar 10 and is removably affixed thereto by the screws 45, see FIG. 3, which are inserted through the openings 36, 37 into threaded engagement with the threaded openings 25, 26.

Disposed interiorly of the saw element 40 are two shaving blades 45 and 45a, see FIGS. 4 and 5, arranged in diametrically opposed relation and with the lowermost ends 46 and 46a of the cutting edges of the blades flush with the saw teeth 41. The blades are shaped to fit the cylindrical interior surface of the saw element with their cutting edges spaced therefrom and angularly related thereto, and to the axis thereof such that the same will shave off the wood cut in much the same manner as the well known hand operated pencil sharpener does. The blades of the embodiment shown, may be secured to the saw element by rivets or by welding through holes 47 and 48. FIG. 4 illustrates one of the shaving blades, the securing thereof to saw element 40 being by screws 49 and 68 as seen in FIGURE 5. The length of the edges of said shaving blades are preferably such that the upper ends thereof will terminate short of half the length of the cylindrical saw element.

Formed in the cylindrical saw element 40 are a plurality of longitudinal slots 50, only one of which is shown, there being preferably three in number. The slots 50 function to accommodate expansion of the saw element in use and to prevent binding.

In use, the self-cleaning hole saw device will collect the cut and shaved wood within the upper part of the saw element 40, there being sufficient space therein to accommodate the shavings and cuttings, until the hole is completely cut without interruption from start to finish. The butt edge 32 of the flange 31 of the head 30 when it engages the surface of the work in which the hole is cut, will act as a stop to limit further penetration of the saw unit. Upon removal of the saw unit from the work, the shavings and cut wood will readily drop out of the saw element.

In the modification of FIG. 7, the cylindrical saw unit 14a includes a circular head 30a to which is suitably secured to be integral therewith a cylindrical saw element 40a provided in its wall portion with circular openings 51 serving the same purpose as slots 50 in the saw element 40. The saw element 14a is secured to a collar 60 in a manner similar to that for the attachment of saw element 14 to collar 10. Extending through the collar 60 is a stud 12 identical with stud 12 employed with collar 10, see FIG. 1. The teeth 41a and the shaving blades (not shown) within the saw element 40a are case hardened so as to be able to cut thin metal also.

The stud 12 at the terminal end of the threaded portion 18 is provided with an axial opening 55 for the reception of a centering screw (not shown), as is well known from proper positioning of the hole device on the work.

FIG. 2 shows a conventional drill bit 65 that may be used with collar 10 for drilling purposes. In such cases, the cylindrical saw unit 14 is detached from collar 10 and the stud 12 moved outwardly of collar 10 so that the terminal end 18a of the screw portion 18 is placed beyond threaded opening to thereby provide an opening for the reception of shank 66 of drill bit 65. Formed in shank 66 is a recessed notch 67 having a flat bottom. With the shank 66 fitted within bore 16 of collar 10 and the notch 67 lined up with set screw 21, the drill bit will be then secured to the collar 10 by singly setting up on the set screw 21 as will be readily apparent.

Turning now to another embodiment of the inventive concept as depicted in FIGS. 9-15, there is shown in these figures a hole saw which comprises a cap or crown member 70 which is formed or shaped from an individual piece of material so as to have an annular flange 72 around the periphery thereof. At the center portion of the cap or crown member 70 is a threaded hole 74 to accommodate the mandrel member commonly used with such devices. On each side is a pair of spaced holes 76 and 78 which are adapted to receive the retaining members of the mandrel.

The cylindrical saw unit 80 having cutting teeth 87 of the hole saw of this embodiment is welded or otherwise attached in a permanent fashion to the outside flange of the crown in a manner known to the art. This cutting member is depicted at 80 with particular reference to FIG. 9, FIG. 11, FIG. 13 and FIG. 14. Longitudinal slots 89 and 90 are formed in the saw unit 80 to accommodate expansion and prevent binding as in the first embodiment.

The flange 72 of the crown member 70 is adapted with slots or grooves in at least two positions as shown at 82 of FIG. 13. There is placed in these slots or grooves the removeable cutting member 84 which is shown in detail in FIG. 10. Cutting blade 84 is equipped with a threaded hole 86 to receive through a hole in the annular saw portion 80 (the hole being shown in FIG. 13 as 88) a fastening screw shown at 90 in FIG. 12. Whereas this fastening or retaining screw is shown with a tapered head in the drawing it is to be understood that any form of this fastening screw may be used since it is positioned at the top of the cutting edge of the saw and ordinarily does not interfere with the hole cutting operation.

Turning now to the cutting blade as shown specifically in FIG. 10, cutting edge 92 is the operable cutting member with the plane shown at 94 being ground at an angle of about 10° to 14° from the vertical edge 96 of the cutting blade. The face plane is similarly ground at an angle from cutting edge 92 preferably from about 13° to 17° from the leading cutting edge 92, the angle being measured from the horizontal face of the cutting blade which is shown at 98. The cutting edge 92 is ground at an angle of approximately 12° from the vertical face corner 100. Thus the cutting blade is of compound angular planes and forms a triangular shape on the bottom end thereof as shown in FIG. 8. When in rotary motion, cutting edge 92 shaves the corresponding edge from the material being cut so that when the hole is completely finished the interior plug, has sides which are at an angle of approximately 12° and therefore does not bind in the annular cutting surface of the saw and immediately drops out once the saw is removed.

Whereas as depicted in the drawings there are two cutting blades inserted in the hole saw, it is to be understood that a number of these cutting blades may be inserted in position as is shown.

It is also contemplated that a self-cleaning hole saw may be made by slotting the saw 80 bending the slotted material inward and sharpening the inwardly bending portion of the saw so that when the circular saw rotating the plug which is being cut by the rotation of the saw will be shaved at an angle on the exterior surface thereof so as to fall from the circular saw when the hole is completely cut through the material.

Thus it is to be seen that the hole saw of this invention comprises basically a cylindrical saw unit which may be either removeably attached to a plate or crown member or may be permanently affixed thereto and a plurality of cutting blades fitted within said cylindrical saw unit either removeably, permanently, or as an integral part of said saw unit. The basic concept in all embodiments involves the principle of shaving or cutting at a taper or angle the interior plug of material being cut with said circular saw, so that at the completion of the hole cutting operation this interior plug is tapered and readily and easily falls from the circular saw member.

The advantages of the instant concept are immediately obvious to one familiar with the art. It is no longer necessary to dig or break the plug of material which is, in embodiments known to the prior art, firmly affixed to the interior surface of the circular or cylindrical saw unit. With the instant inventive concept the interior plug immediately drops from the circular unit once the blade is removed from the material being cut.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A hole saw device comprising a collar, a stud axially adjustable within said collar having a shank portion for attachment to the chuck of a drill, a cylindrical saw unit removeably secured to said collar and at least one pair of shaving blade means disposed interiorly of said cylindrical saw unit adjacent the lower end thereof, said cylindrical saw unit providing at its upper portion interiorly thereof a collecting chamber for shavings and cuttings.

2. A hole saw device of claim 1, wherein said collar is provided with a threaded axial bore, said stud having a threaded portion engageable within said axial bore for axial movement therein relative to said collar, and means carried by said collar for securing said stud in adjusted position.

3. The hole saw device of claim 2, wherein said collar is further provided with a pair of threaded openings parallel to said axial bore, said saw unit comprising a circular head, a depending peripheral flange on said head, a cylindrical saw tooth element dimensional to fit at its upper end within said peripheral flange and rigidly secured thereto, the lower end of said saw tooth element provided with a peripheral row of cutting teeth, openings in the wall of said saw tooth element providing for expansion and to obviate binding, openings in said head corresponding to the axial bore and threaded openings in said collar and in registry therewith, and screw means extending through said head for securing said saw unit to said collar, said screw means being engageable with said threaded openings therein.

4. The hole saw device of claim 3, wherein the edge of said peripheral flange of said head defines a butt edge or stop to limit downward movement of said saw tooth unit by engagement of said butt edge with the work.

5. The hole saw device of claim 4, wherein each said shaving blade means is shaped to conform with the interior cylindrical surface of said saw element, means rigidly connecting said shaving blade means to said saw element, each of said shaving blade means having a cutting edge angularly related to said interior cylindrical surface and to the axis of said saw element, the lower edge of each said shaving blade means lying in the plane of said cutting teeth and said shaving blade cutting edge being of a length as to provide a space above the upper ends thereof substantially half of the length of said cylindrical saw element whereby to provide said collecting chamber.

6. A hole cutting saw device comprising a crown having as an integral part thereof an inturned annular flange, a circular saw unit integrally attached to the outer surface of said flange a pair of removeably attached cutting blade means disposed interiorly of said circular saw unit adjacent the lower end thereof having a leading cutting edge disposed at an angle to said cylindrical saw unit for shaving a tapered surface on the material being cut with said cylindrical saw.

References Cited by the Examiner
UNITED STATES PATENTS

| | | |
|---|---|---|
| 882,475 | 3/1908 | Martin. |
| 1,494,897 | 5/1924 | Freye _____ 145—120 |
| 2,484,150 | 10/1949 | Brown _____ 145—120 X |
| 2,794,469 | 6/1957 | Shortell _____ 145—120 |

FOREIGN PATENTS 1,005,926  4/1952  France.

WILLIAM FELDMAN, *Primary Examiner.*

MILTON S. MEHR, *Examiner.*

R. V. PARKER, JR., *Assistant Examiner.*